(12) United States Patent
Petak et al.

(10) Patent No.: US 6,875,922 B1
(45) Date of Patent: Apr. 5, 2005

(54) POSITION ADJUSTABLE OUTLET BOX SYSTEM

(75) Inventors: Randy Petak, Pico Rivera, CA (US); Jeffrey Shaw, San Dimas, CA (US)

(73) Assignee: PW Industries, Inc., Pico Rivera, CA (US)

( * ) Notice: Subject to any disclaimer, the term of this patent is extended or adjusted under 35 U.S.C. 154(b) by 0 days.

(21) Appl. No.: 10/829,754

(22) Filed: Apr. 22, 2004

(51) Int. Cl.⁷ .............................................. H01H 9/02
(52) U.S. Cl. .......................... 174/58; 174/58; 174/61; 174/57
(58) Field of Search ........................... 174/58, 61, 57; 220/3.7, 3.92, 3.94, 3.9

(56) References Cited

U.S. PATENT DOCUMENTS

| | | | |
|---|---|---|---|
| 3,620,404 A | 11/1971 | Grasso | |
| 3,814,834 A | 6/1974 | Glader | |
| 4,634,015 A | 1/1987 | Taylor | |
| 5,012,043 A | * 4/1991 | Seymour | ..................... 174/57 |
| 5,042,673 A | 8/1991 | McShane | |
| 5,117,996 A | 6/1992 | McShane | |
| 5,223,673 A | 6/1993 | Mason | |
| 5,606,147 A | * 2/1997 | Deschamps et al. | .......... 174/48 |
| 5,931,325 A | * 8/1999 | Filipov | ....................... 220/3.7 |
| 5,975,323 A | 11/1999 | Turan | |

* cited by examiner

Primary Examiner—Dhiru R. Patel
(74) Attorney, Agent, or Firm—Christie, Parker & Hale, LLP (57) ABSTRACT

A position adjustable outlet box system. The system has an outlet box cage, a mounting plate to which the outlet box cage is attached (having a outlet box aperture formed therein), an outlet box that is slideably retained in the outlet box cage, and a drywall ring having a projecting neck portion, which drywall ring is attachable to the outlet box. An adjustment mechanism is provided to permit adjustment of the depth position of the outlet box in the outlet box guide cage. The adjustment mechanism can includes a bolt that freely rotates along its axial axis (but does not move axially relative to the outlet box cage), a threaded shaft that screws into a threaded hole in a back wall of the outlet box and turning means that is accessible from within the outlet box to permit the outlet box's depth position within the cage to be adjusted as needed.

22 Claims, 15 Drawing Sheets

POSITION ADJUSTABLE OUTLET BOX SYSTEM

FIELD OF THE INVENTION

This invention relates to the field of outlet box mounting systems, and more particularly, to a position adjustable outlet box system suitable for mounting electrical devices, communication and electronic cabling, gases, and the like.

BACKGROUND OF THE INVENTION

In construction applications, electrical devices such as switches and plug outlets are mounted within boxes which themselves are retained within walls, floors and ceilings with power supply conduits supplied to the box and to the electrical device contained therein. Outlet boxes are also used for mounting other devices such as communication cabling including optical communication, co-axial cables, twisted pair of cables and the like. Furthermore, outlet boxes can also be used to contain various valve and control devices such as in hospitals where various gases such as oxygen can be supplied in wall or in floor applications. Vacuum supply can also be provided to such outlet boxes. In typical construction applications, walls, floors, ceilings and the like are formed from a number of individual joists, studs, and rafters. Covering material is applied over the studs, joists and rafters with such covering materials including a wide variety of materials such as drywall, plywood, tile backing board, tiles, marble, lathe and plaster, stucco and a variety of other materials. The ultimate thickness of such materials applied onto studs, joists and rafters is not always known at the time the outlet boxes are mounted to the studs, joists, and rafters. In residential construction, outlet boxes are typically mounted such that the open mouth rim of the outlet box will be flush with the anticipated covering material. For example, when half-inch thick drywall is applied to studs, the outlet boxes will be installed such that they extend about one-half inch beyond the face of the studs, and when 1.6 cm (⅝-inch) thick drywall is installed, the boxes would be installed about 1.6 cm (⅝-inch) extending from the face of the studs. Thereafter, when the drywall is installed, a hole will be cut in the drywall to permit the box to project therethrough and remain flush with the outer surface of the drywall. Of course, if the builder decides to install a thicker wall covering material or apply additional layers of material after the conduit boxes are installed, the builder may need to first remove the wall covering material to expose the outlet boxes, reposition the outlet boxes and reapply the wall covering material.

In commercial and industrial construction, drywall rings are more typically used to set the distance to which the box extends outwardly from the studs. These drywall rings are usually attached with screws to the open front of the conduit box and can be selected as to the appropriate extension. These drywall rings have a rim portion that will lie behind the wall covering material once installed and an extension portion that extends through the hole formed in the wall covering material. Drywall rings provide a better interface between the conduit box and the hole made in the covering material. However, this can be a big problem because once the wall material is covered over the conduit box, it is typically not possible to replace the dry wall ring without breaking away the covering material, e.g. if the builder or someone who comes back decides to later apply an extra layer of material.

It would accordingly be desirable to have position adjustable outlet box system that permits a user to adjust the degree to which an outlet box projects even after the outlet box is installed and covered with wall facing materials.

SUMMARY OF THE INVENTION

The position adjustable outlet box system has an outlet box cage which is attachable to a mounting bracket having an aperture formed therein. The outlet box cage is sized and dimensioned such that an outlet box will be able to slide inwardly and outwardly therefrom. The outlet box can be a conventional outlet box. A drywall ring with an extra long projecting neck portion, (e.g. about 4.0 cm or 1½ inches) is attached to the open face of the outlet box. The outlet box cage has support brackets which engage with a mounting plate, which mounting plate attaches to studs, joists, rafters, and the like. A depth adjustment mechanism is used to adjust the position of the outlet box within the outlet box cage. The depth adjustment mechanism can comprise a bolt, having a head which freely rotates relative to the outlet box cage, and a threaded shaft which threadably engages with a threaded hole in a back wall of the outlet box. The depth adjustment bolt can have an engagement portion to permit the depth adjustment bolt to be turned with a tool. This action of turning the bolt will cause the outlet box to be selectively moved inwardly and outwardly of the outlet box cage. In this manner, a top edge of the drywall ring can be made to be positioned at the ideal level relative to any wall covering material, even after the outlet box and its drywall ring is attached and a covering material is applied.

DETAILED DESCRIPTION OF THE INVENTION

Figure 1:
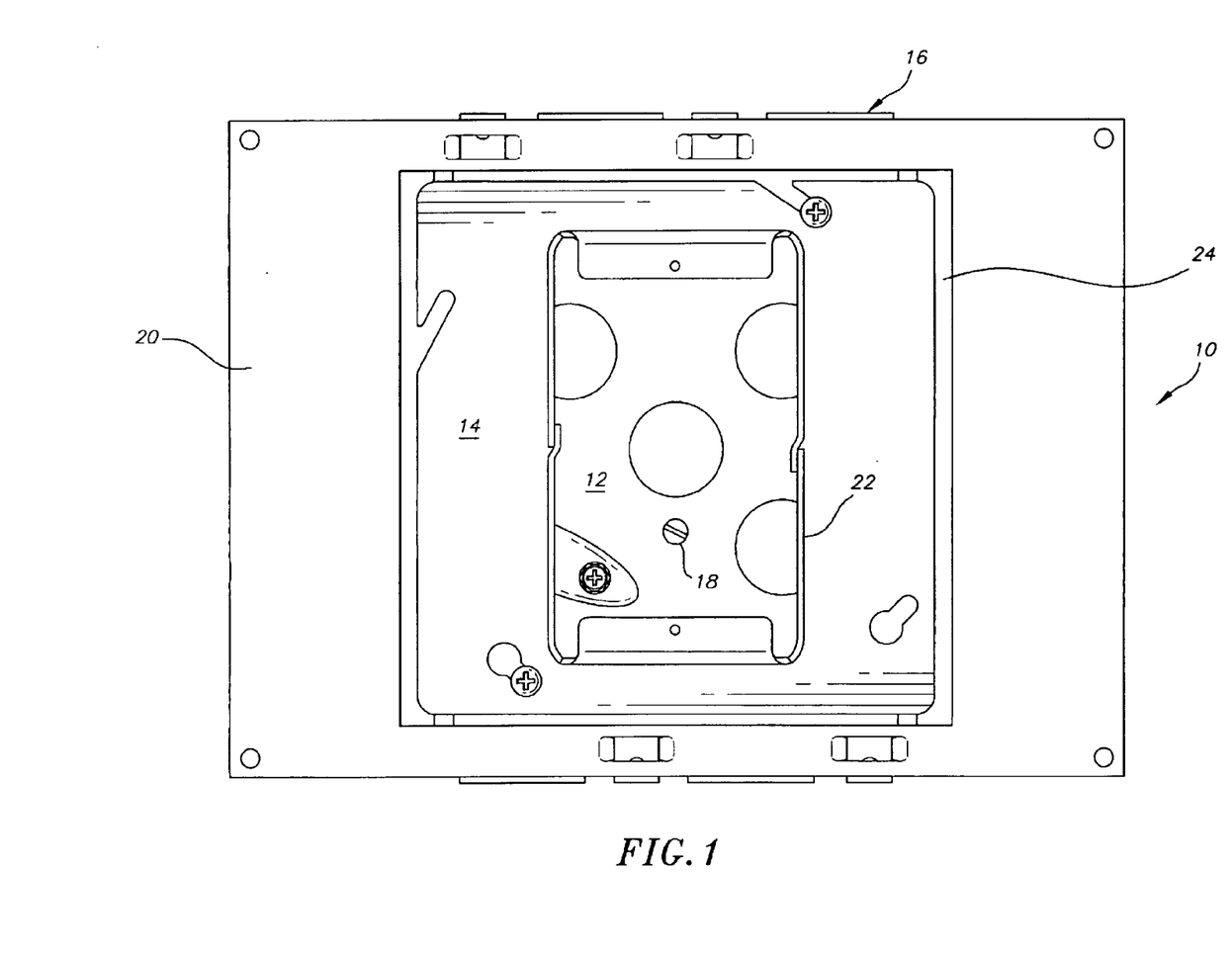
FIG. 1 is a front plan view of an exemplary position adjustable outlet box system of the invention.

FIG. 1 is a front plan view of the position adjustable outlet box system 10 of the invention. The position adjustable outlet box system 10 includes an outlet box 12, a drywall ring 14 attached to an open front face of the outlet box, an outlet box cage 16 within which outlet box is slideably positioned, an adjustment bolt 18 which attaches between outlet box cage 16 and outlet box 12, and a mounting plate 20, which mounting plate 20 is suitable for attachment to a stud, joist, rafter, etc. (not shown) of a wall, ceiling or floor and the like. Drywall ring 14 has an extra long projecting neck portion 22 (e.g., at least about 2.5 cm (1 inch) and preferably about 4 cm (1½ inches) long or longer, up to about 5.1 cm (2 inches)), or as long as the realistically possible thickness of wall covering material which could ultimately be applied over the walls, ceiling, floor, etc. Mounting plate 20 has an aperture 24 formed therein which is sized to be at least as large as drywall ring 14. To permit outlet box 12 to be dropped through aperture 24, aperture is preferably sized larger than the dimension of outlet box 12.

Figure 2:
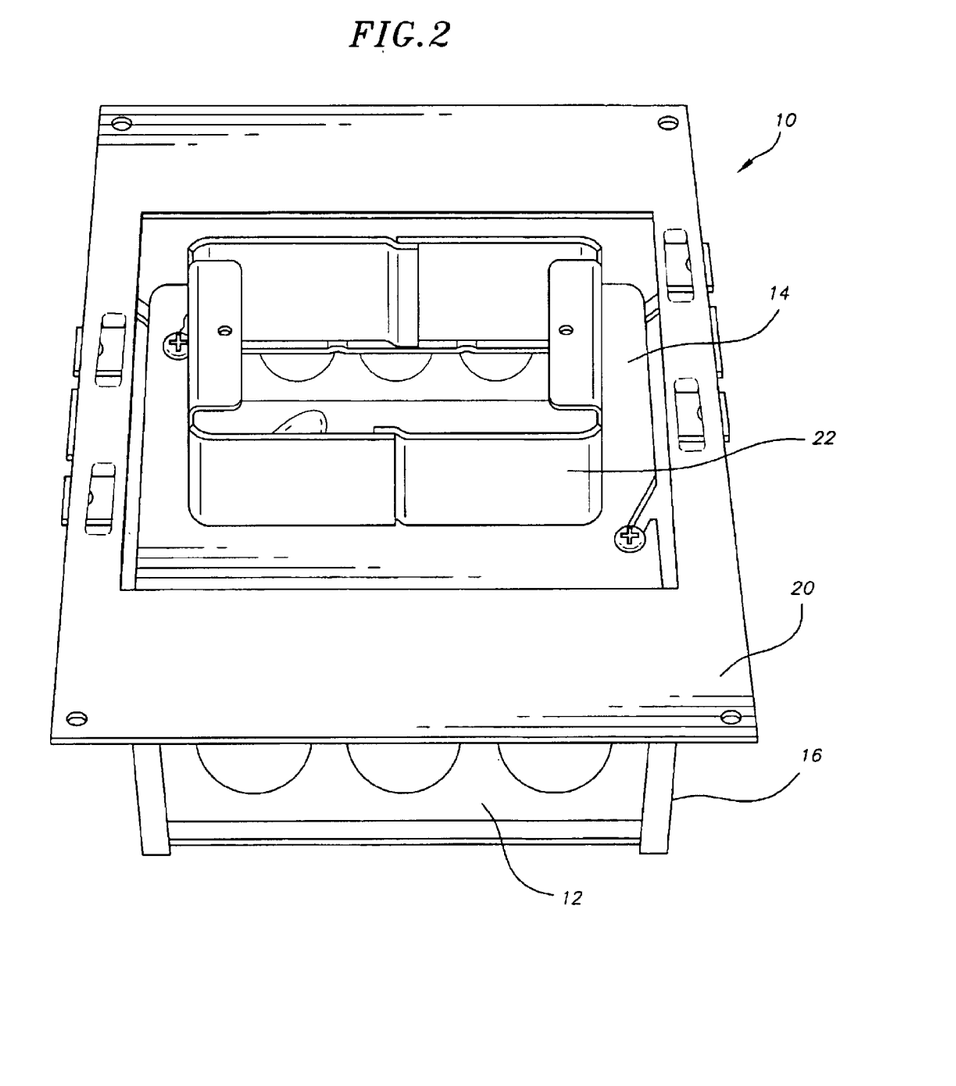
FIG. 2 is a front side perspective view of the position adjustable outlet box system of FIG. 1.

Turning to FIG. 2, there is shown a front side perspective view of the exemplary position adjustable outlet box system 10 of FIG. 1.

Figure 3:
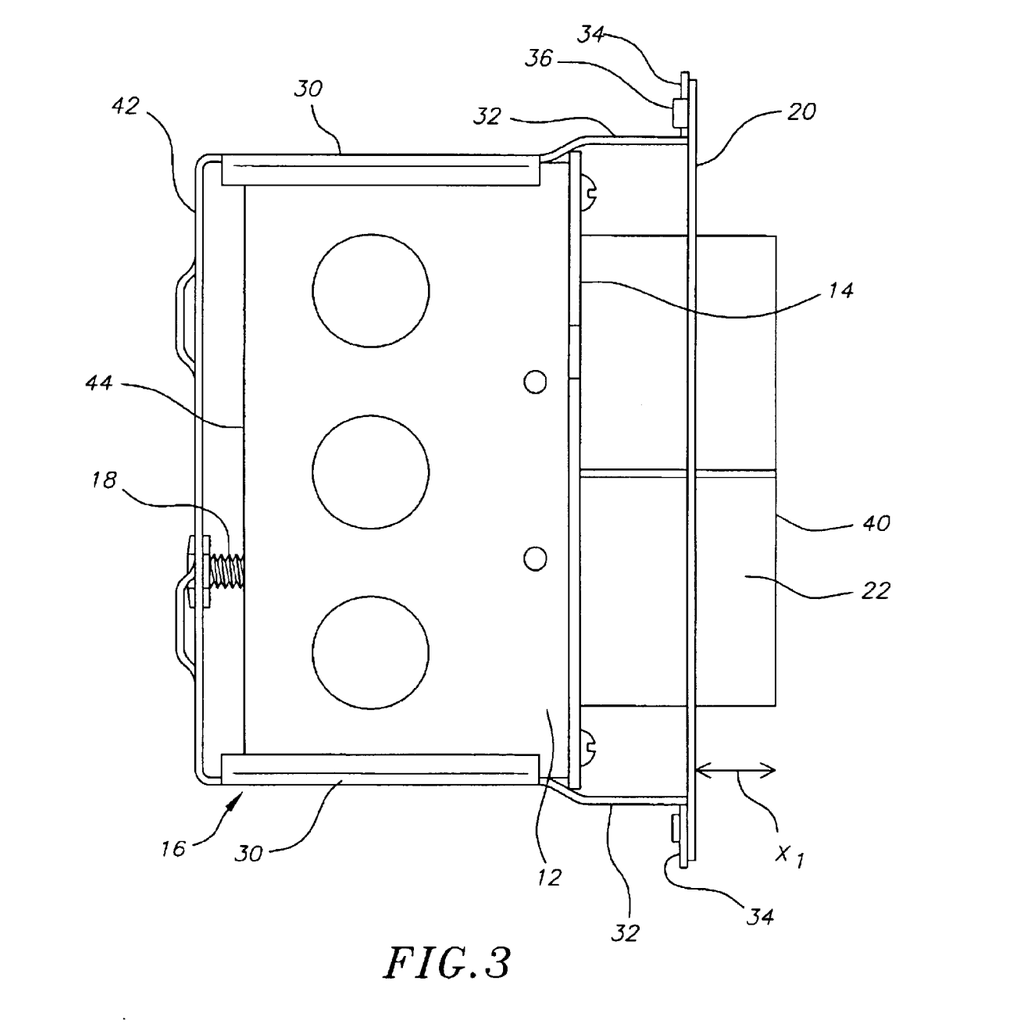
FIG. 3 is a side view of the exemplary position adjustable outlet box system of FIG. 1, with the outlet box with its attached dry wall ring in a retracted position relative to the outlet box cage.

FIG. 3 is a side view of the exemplary adjustable outlet box system 10 of FIG. 1 with outlet box 12 retracted into outlet box cage 16 as can be seen, outlet box cage 16 has guide rails 30 to guide outlet box 10, bracket portions 32 and tabs 34. Tabs 34 can be adapted to engage with catches 36 formed on mounting plate 20. As can be seen, projecting neck portion 22 has a leading edge 40. The distance between the leading edge 40 and the surface of mounting plate 20 will change as outlet box and its carried drywall ring is moved inwardly and outwardly of outlet box cage 16. Outlet box 12 is shown retracted into outlet box cage 16 such that drywall ring projects by distance $X_1$, which may be set to be the thickness of the thinnest probable wall covering material (e.g. 1.3 cm or ½ inch). Outlet box cage has a back wall 42 and outlet box 10 has a back wall 44. Depth adjustment bolt 18 extends from back wall 42 of outlet box cage through a threaded hole (not shown) in back wall 44 of outlet box and therethough.

Figure 4:
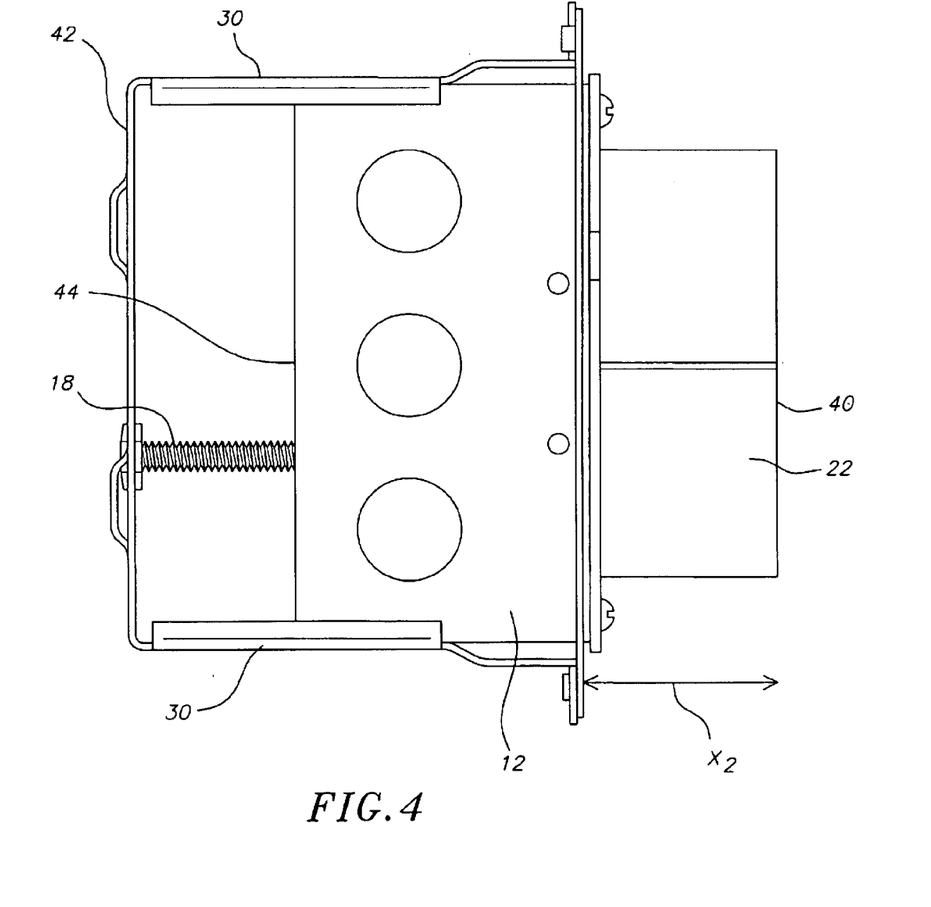
FIG. 4 is a side view of the exemplary position adjustable outlet box system of FIG. 1, with its outlet box in its extended position relative to the outlet box cage.

Turning to FIG. 4, there is shown a side view of the exemplary position adjustable outlet box system of FIG. 1, but with outlet box 12 extending further out than shown in FIG. 3 such that the distance $x_2$ between leading edge 40 of projecting neck 22 extends greater distance $x_2$ than its projecting distance of $x_1$ shown in FIG. 3. This is readily accomplished as position adjustable bolt is turned such that rear wall 44 of outlet box is pushed further away from rear wall 42 of outlet box cage 42. Guide rails 30 keep outlet box 12 in a stable position.

Figure 5:
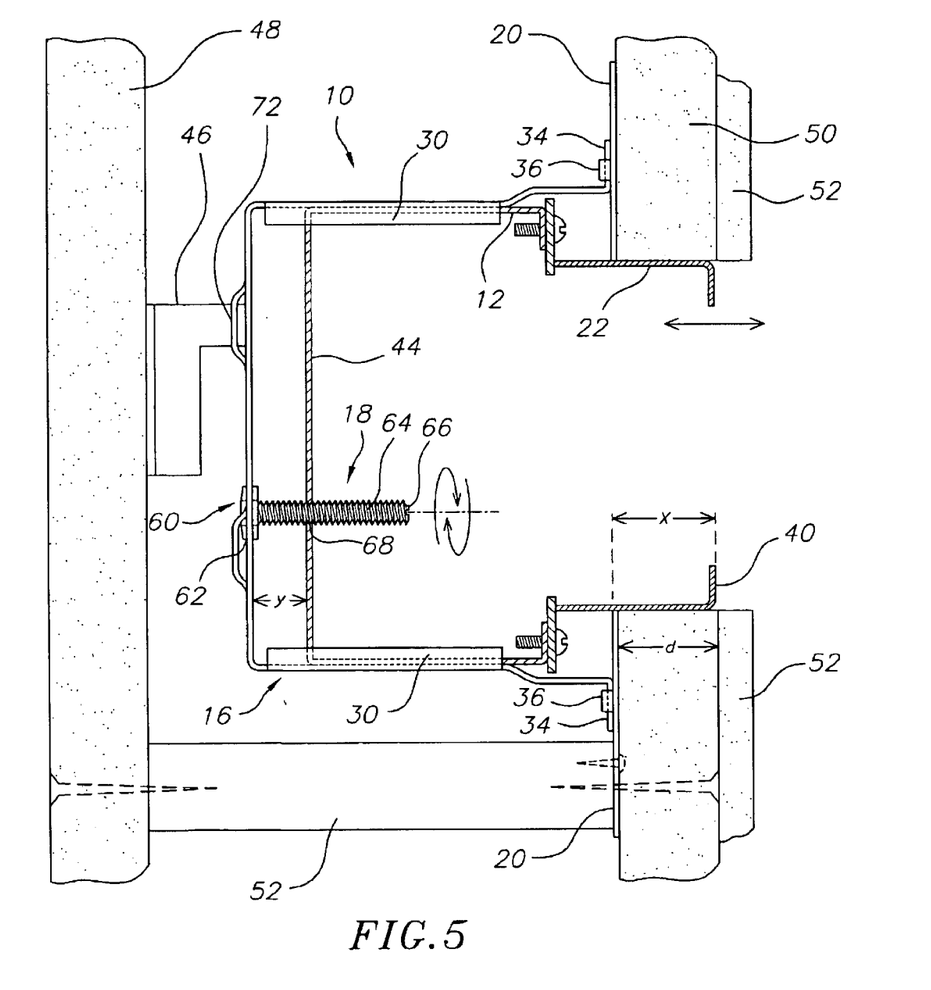
FIG. 5 is a schematic cross-sectional view showing various portions of the exemplary position adjustable outlet box system of FIG. 1.

FIG. 5 is a cross-sectional view showing the exemplary position adjustable outlet box system 10 retained in a wall covered by facing material and with mounting plate 20 attached to a stud 52. Other features as shown in previous drawing figures. Position adjustment bolt 18 forms part of the adjustment mechanism and in this exemplary embodiment has a unique head 60 with a slot 62 formed therein at a distal end thereof. Slot permits head 62 to engage within a slot 70 shown in FIG. 6) in backwall 42 of cage. Adjusted bolt 18 has a threaded shaft 64 and a turning end 66 at a proximal end thereof. Threaded shaft portion 64 is threadably engaged with a threaded hole 68 in back wall 44 of outlet box 12. Turning end 66 of threaded shaft 64 can be turned with a tool (e.g. a screwdriver, nutdriver, etc. not shown) and by turning the position adjustment bolt 18, this will cause outlet box 12 to either move inwardly and outwardly within outlet box cage 16, thereby adjusting the distance y between cage back wall 42 and outlet box back wall 44 and also adjust the distance x that leading edge 40 of drywall ring 14 extends above mounting plate 20. However, this turning does not cause axial movement of the adjustment bolt 18. As is shown, even after installing wall covering material 50, it is possible to adjust the level of leading edge 40 relative to wall covering material by adjusting adjustment bolt 18. For example, if additional wall covering materials 52, such as tile, is applied to wall covering material 50, the level can be adjusted and all without removing wall covering material 50 or physically remounting or replacing the dry wall ring.

Outlet box cage 16 preferably has catches 72 formed thereon. These catches 72 can be die cut from the material of the outlet box cage 16 and can be used to engage a far-side bracket 46. Far side bracket 46 can be used to abut wall covering material 48 affixed to the opposite side of stud 52, and will help to stabilize position adjustable outlet box system 10, for example, in cases where mounting plate 20 is cantilevered and is not supported by two studs.

Figure 6:
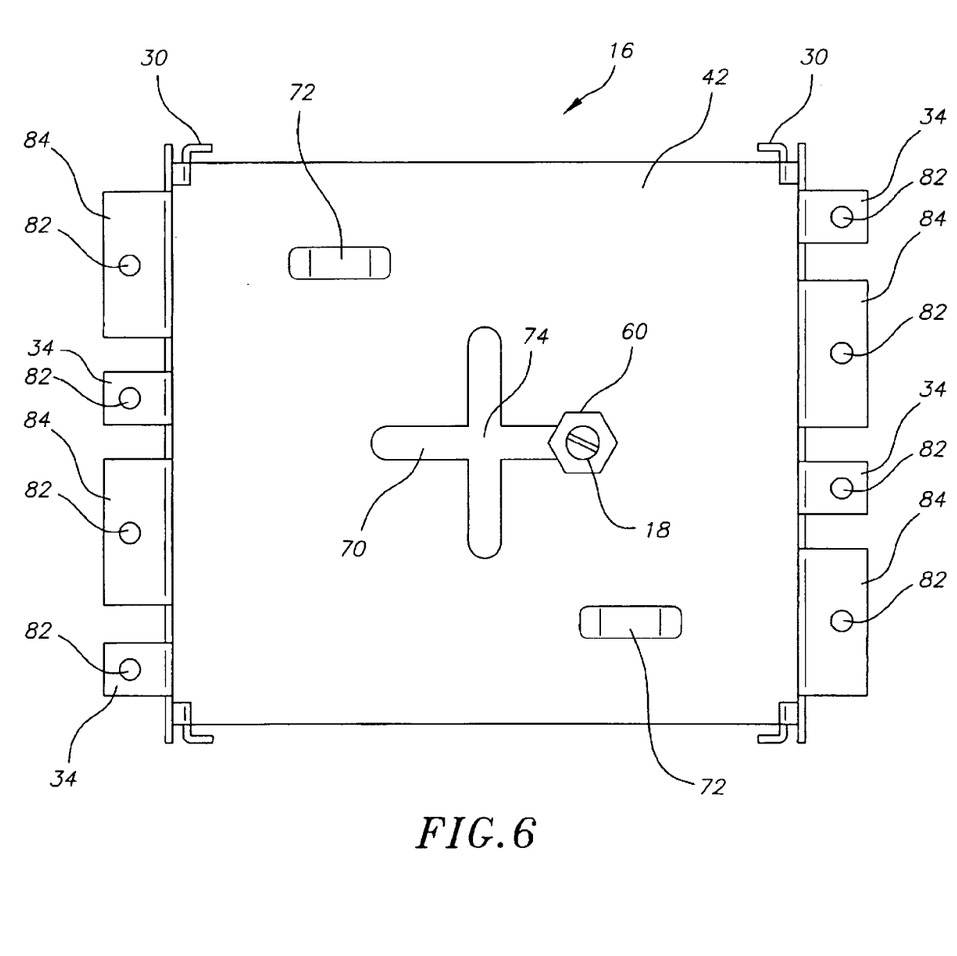
FIG. 6 is a front plan view of an exemplary outlet box guide cage.

FIG. 6 is a front plan view showing an exemplary outlet box guide cage 16. Back wall 42 has slots 70 formed therein. Although an x-shaped slot pattern is shown with a central opening 74, other slots patterns can be used. Central opening 74 is enlarged to permit head 60 of adjustment bolt to be inserted. Optionally, catches 72 can be formed on back wall 42 so that far side brackets can be engaged with catches 72, as shown in FIG. 5. Rails 30 and tabs 34 are shown, as are other features described above. Holes 82 are formed in tabs 34 and also in wide tabs 84.

Figure 7:
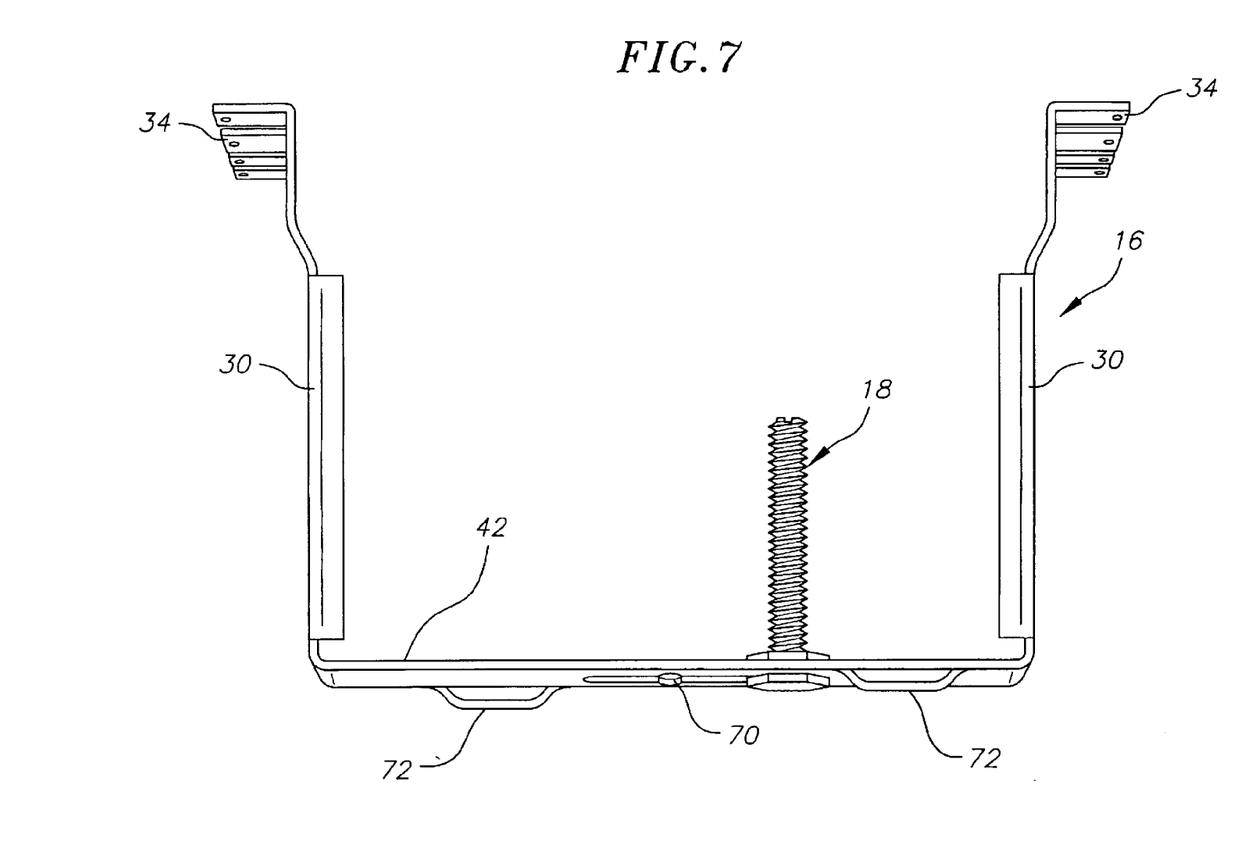
FIG. 7 is a side view of the exemplary outlet box guide cage of FIG. 6 with a position adjustment bolt.

Turning to FIG. 7, there is a side view of the exemplary outlet box cage 16 with position adjustment bolt 18 inserted into slot 70. Slot 70 permits outlet box, with its threaded aperture 68, to be mounted in any number of positions as required relative to the position of outlet box cage 16.

Figure 8:
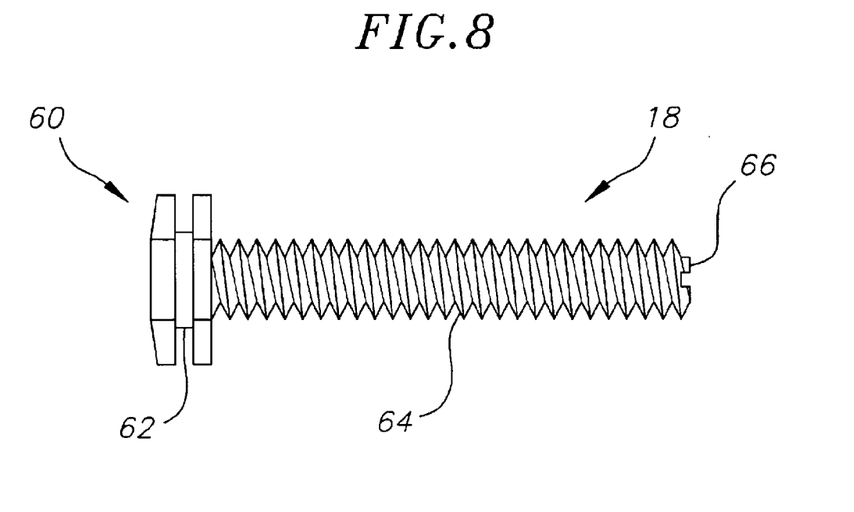
FIG. 8 is a side of an exemplary position adjustment bolt.

FIG. 8 is a side view of position adjustment bolt 18 with its threaded shaft 64, its head 60 with slots 62 formed therein. The head 60 can be a typical hexagonal head and slot 62 can be cylindrical such that when bolt is inserted with its head 60 through slot 70 (see FIG. 6 and FIG. 7) head 60 will be insertable through enlarged area 74 of slot 70 and by sliding head such that its slot 62 engages with slot 70, it will be freely turnable yet not be detachable from back wall 42.

Figure 9:
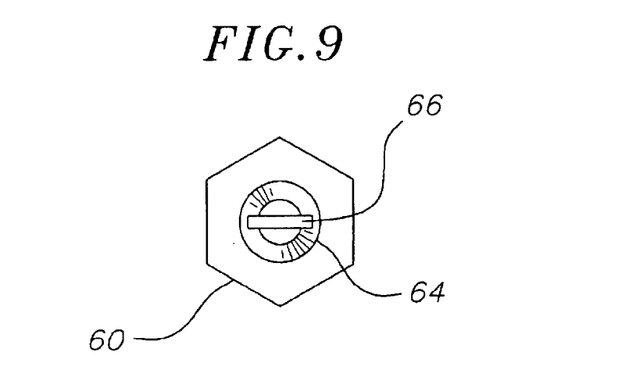
FIG. 9 is a front view of the position adjustment bolt of FIG. 8.

FIG. 9 is a front view of position adjustable bolt 18 and shows its turning engagement 66, which is shown as a slot formed in a distal end of threaded shaft 64. However, a hexagonal end or any other type of turning engagement can be provided at the proximal end.

Figure 10:
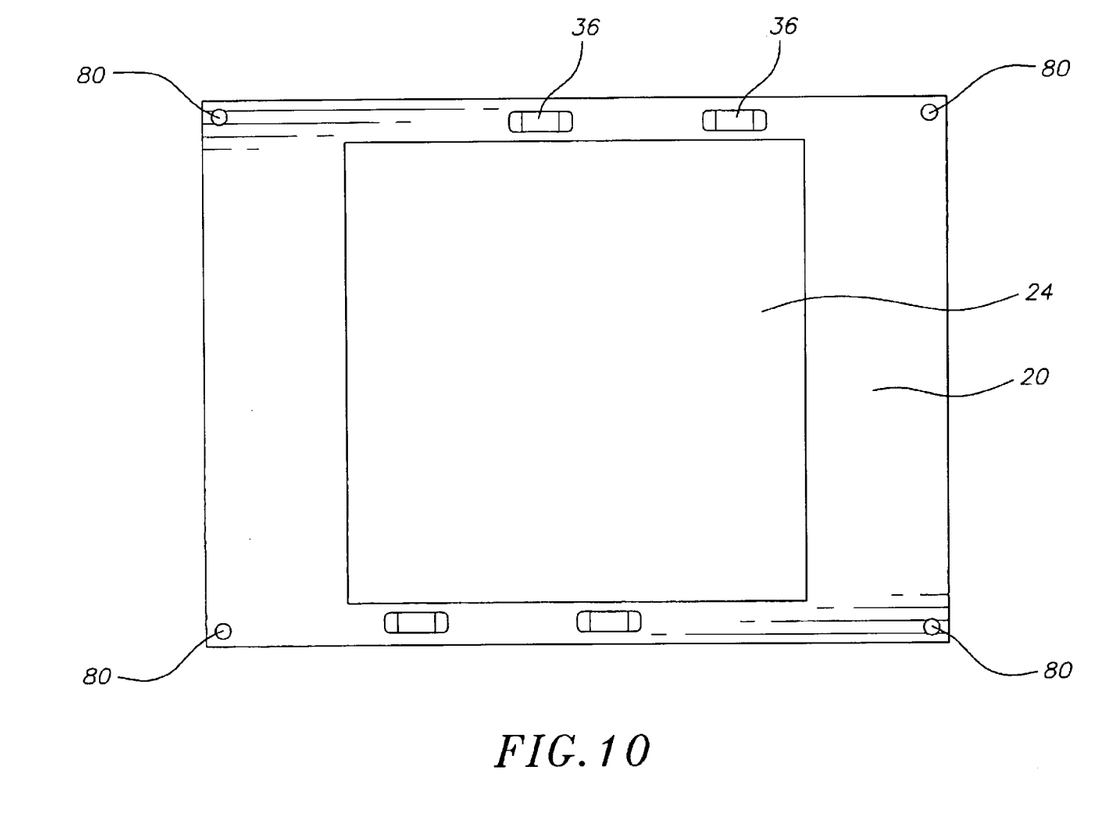
FIG. 10 is a back plan view of an exemplary mounting plate of the invention.

Turning to FIG. 10, there is shown a backview of the exemplary mounting bracket 20 shown in FIGS. 1–5, with its aperture 24 and its catches 36. For purposes of attaching mounting plates 20 to a stud (as shown in FIG. 5), apertures 80 can be preformed in mounting plate.

Figure 11:
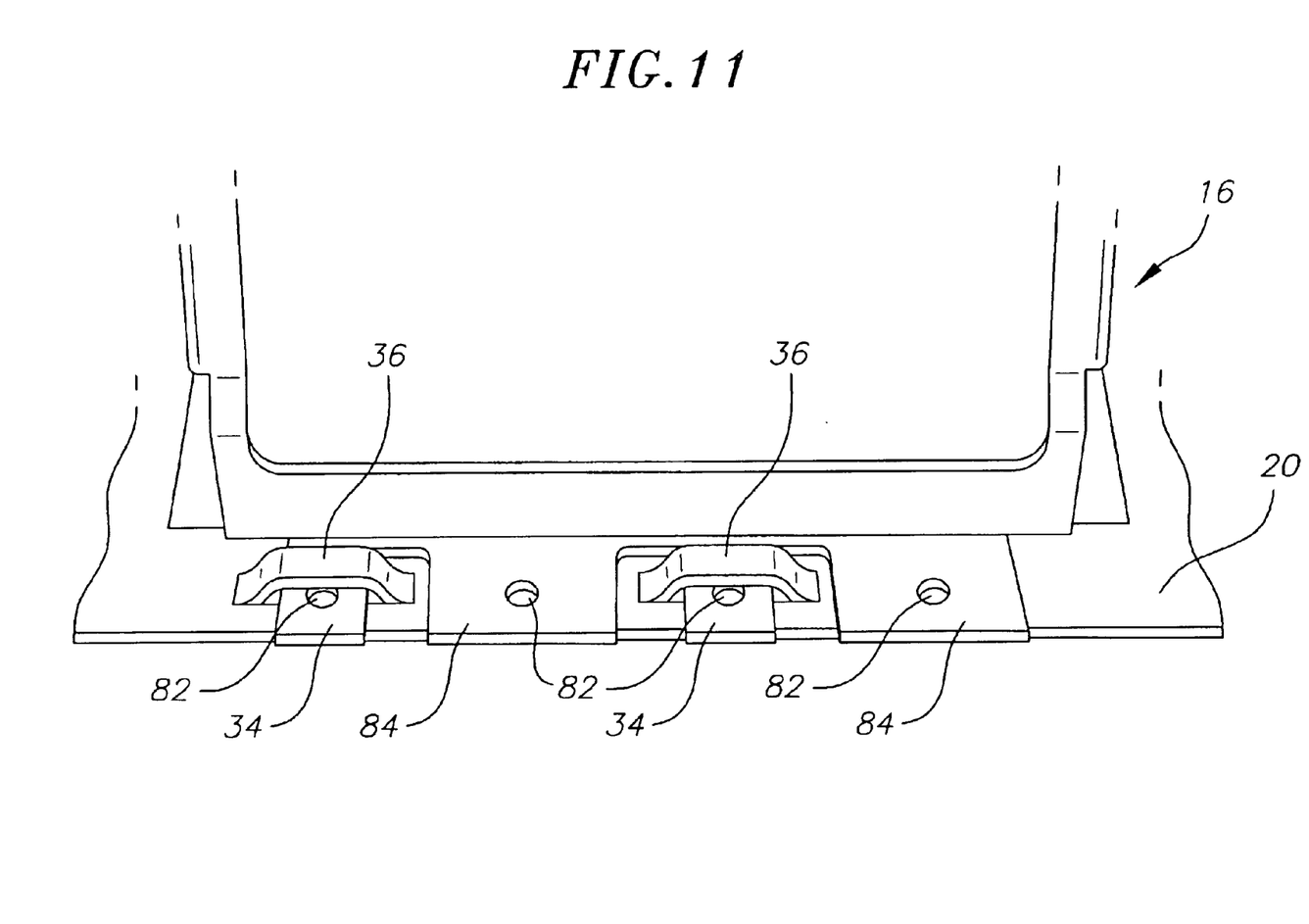
FIG. 11 is a perspective view of a detail showing an exemplary engagement of an outlet box cage and the mounting plate.

FIG. 11 is a detail showing the engagement of outlet box cage 16 attached to mounting plate 20 and shows tabs 34 of outlet box cage 16 slid through catches 36 formed on mounting plate 20. This type of attachment permits easy and quick attachment of mounting cage to any number of different styles of mounting plates and does not require any screws or any special equipment. The quick, yet secure attachability of outlet box cage 16 to mounting plate 20 permits different cages to be attached to different guide plates. This feature allows a fewer number of parts to be manufactured while maintaining great adaptability to meet different requirements. Alternatively, the outlet box cage 16 could be integrated with the mounting bracket or could be permanently attached or attachable by screwing the pieces together. Holes 82 in tabs 34 and wide tabs 84 can also be optionally provided, and as best shown in combination with FIGS. 14 and 15, can be used for securement of mounting cage 16 to a bracket with elongate slots by passing self-tapping screws (now shown) through slots 116 and 118 in bracket 110 and tapping them holes 82 in tabs 34 and/or wide tabs 38. By tightening the screws, tabs 34 and wide tabs 84 will be tightened tightly against the back of the bracket and be retained there. In lieu of self tapping screws, holes 82 can be pre-threaded if desired, to thereby allow regular screws to be used.

Figure 12:
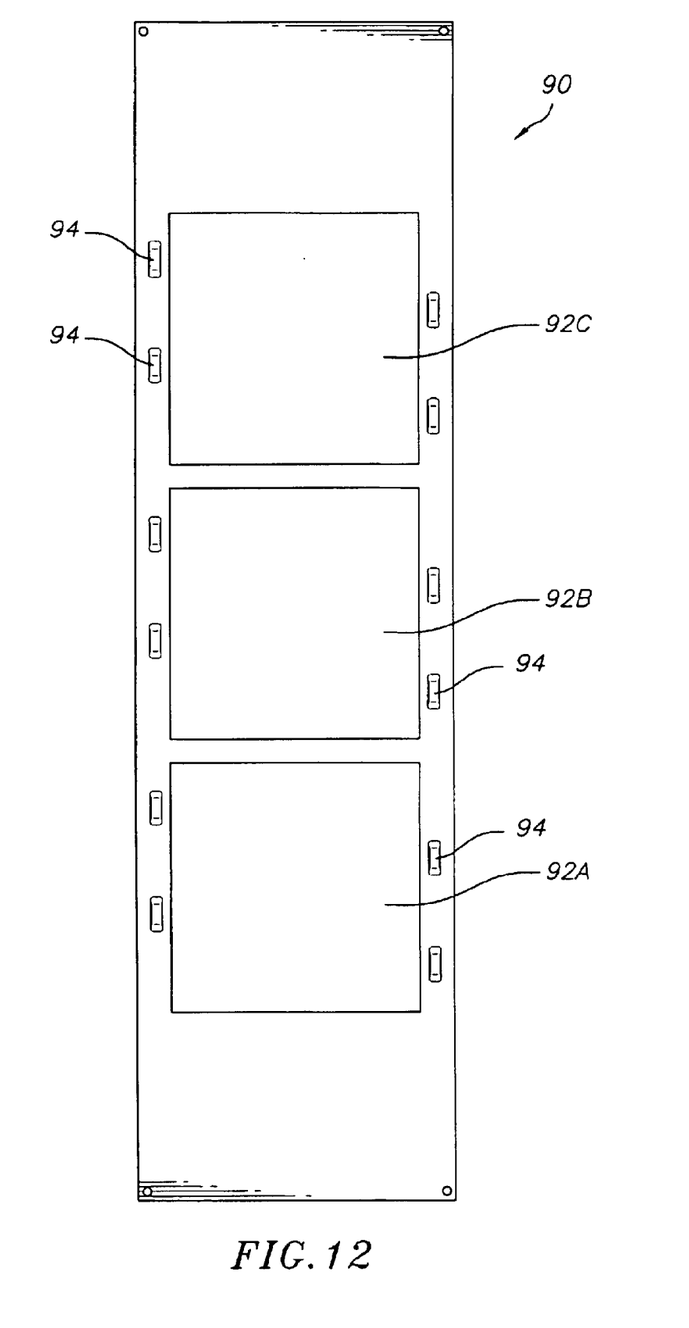
FIG. 12 is a back plan view of another exemplary mounting bracket.

Turning to FIG. 12, there is shown a back plan view of another exemplary mounting bracket 90, having three apertures, 92a, 92b and 92c, to permit the installation of three separate outlet boxes, and/or permit positioning of one or two outlet boxes in multiple positions. It has multiple catches 94.

Figure 13:
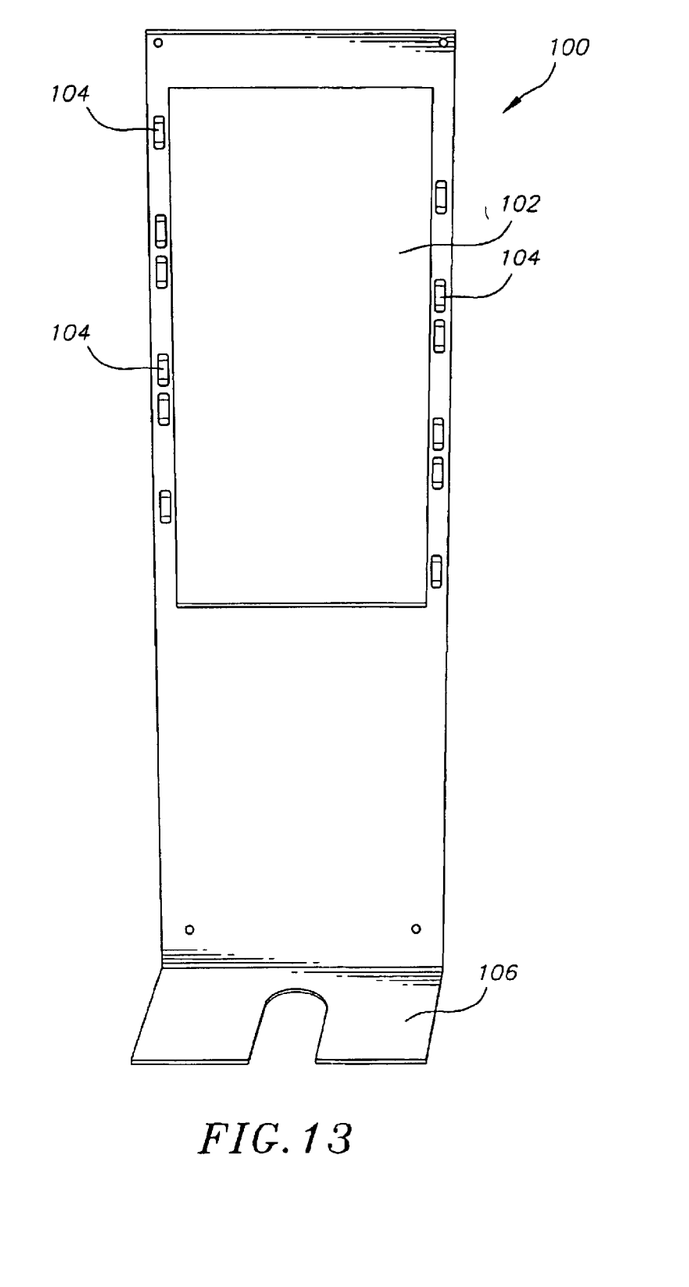
FIG. 13 is front perspective view of an exemplary floor mountable box mounting bracket.

FIG. 13 is a front perspective view of yet another embodiment of a mounted bracket, this being a mounting bracket 100 for mounting to a floor and has an enlarged aperture 102 with a plurality of catches 104. Floor track mount portion 106 permits this bracket to be attached to a floor rail and the elongate aperture 102 permits an outlet box to be adjusted for the desired height. For applications where the height is set, the aperture 102 can have a square shape (not shown) or multiple square aperture can be provided at different heights (not shown).

Figure 14:
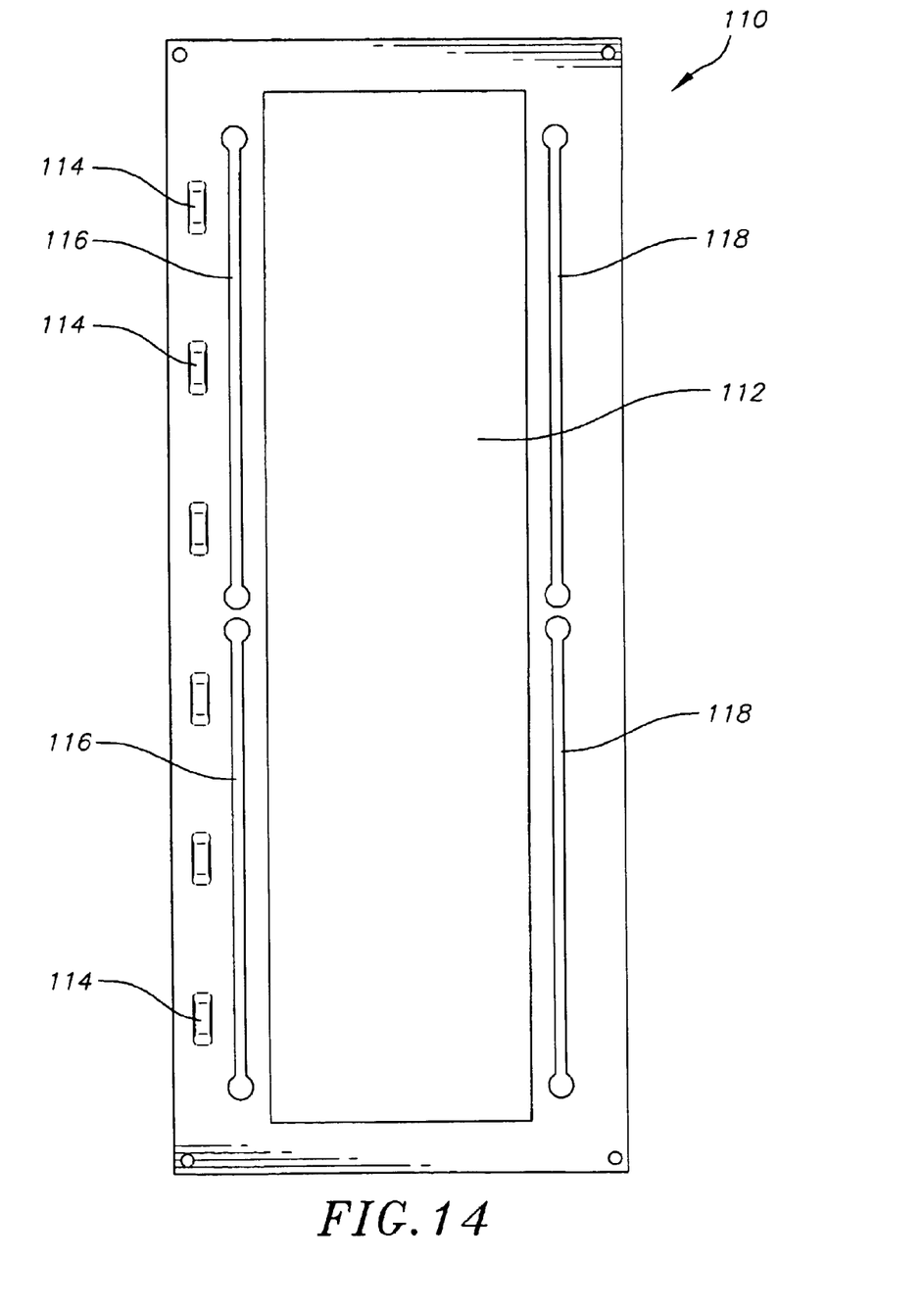
FIG. 14 is a back plan view of an exemplary adjustable mounting plate.

FIG. 14 is a back plan view of an adjustable sliding bracket 110 which has an elongate aperture 112, a plurality of catches 114, and elongate slots 116 and 118 formed along the longer side of the elongate aperture 112. These elongate slots can be used in when mounting the mounting plate to a stud or joist and will permit the mounting plate to be slid to the appropriate position relative to the stud, joist or rafter.

Figure 15:
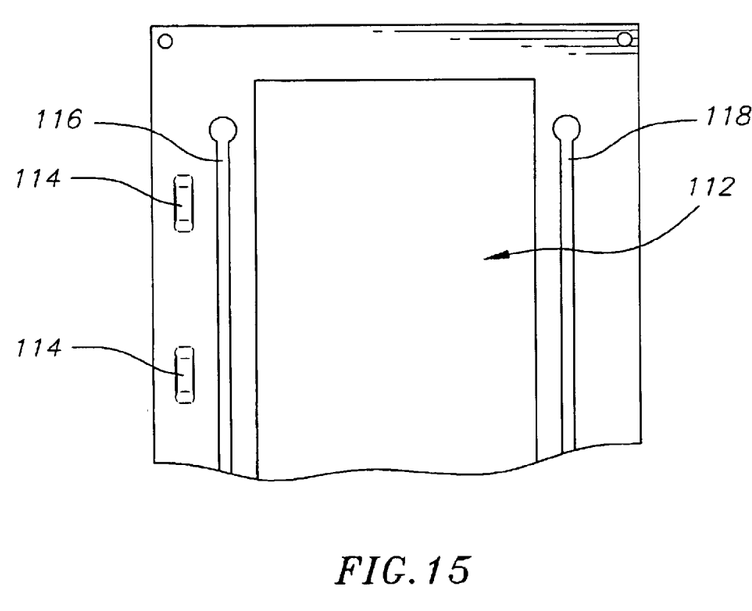
FIG. 15 is a detail of the adjustable sliding plate of FIG. 14.

Lastly, FIG. 15 is a detail showing the adjustable sliding bracket 110 of FIG. 14 and shows in better detail the elongate slots 116 or 118, the catches 114 and the elongate aperture 112.

Figure 16:
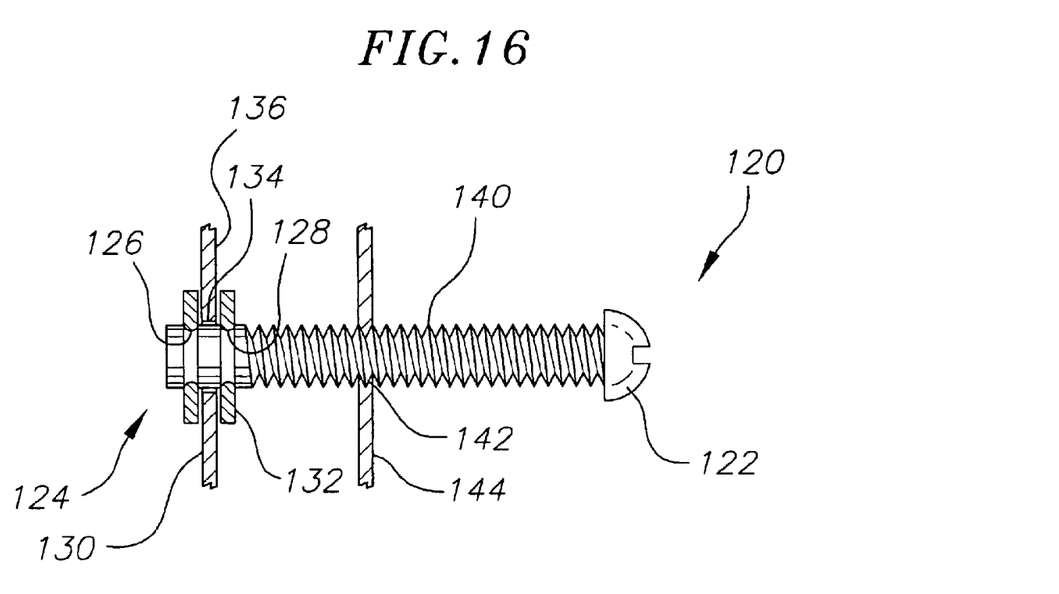
FIG. 16 is a detail showing another exemplary embodiment of a depth adjustment mechanism.
Figure 17:
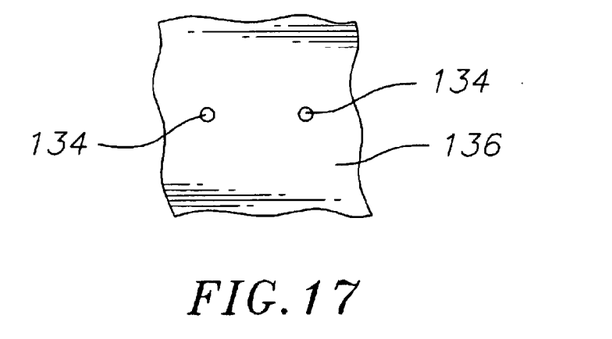
FIG. 17 is a detail plan view of a section of an outlet box cage's back wall.

Turning lastly to FIGS. 16 and 17, there is shown an alternate embodiment of an adjustment bolt. In this adjustment bolt system, a bolt 120 has head 122 with turning engagement, such as a Philips screwdriver slot or other turning surfaces, and at a distal end 124 has two spaced apart grooves, 126 and 128. C-rings 130 and 132 (or other retainers) can be snapped into grooves 126 and 128, respectively, after bolt is placed through an aperture 134 formed in a back wall 136 of outlet box cage. The threaded shaft 140 of bolt will pass through a threaded aperture 142 formed in a back wall 144 of outlet box. This embodiment of the position adjustment bolt will also function to provide a position adjustment function of the outlet box relative to the cage.

The drawings show rectangular outlet boxes in the form of electrical outlet boxes and rectangular outlet box cages, but other shapes could be used as desired, such as octagonal boxes. Indeed, other types of outlet boxes are contemplated, such as for data communication, telephone, gases, vacuum and fluids. Furthermore, while the position adjustable bolt is shown as having a head with a slot formed therein, other means can be used to permit a position adjustable bolt to be freely rotated relative to the guide cage yet threadably engage the conduit box, thereby permitting the depth position of outlet box within cage to be adjusted as desired.

FIG. 17 shows a portion of back wall 136 of cage with apertures 134 formed therein. Apertures are sized relatively largely compared to shaft 140 of bolt, to permit bolt to freely turn therein.

The drawings in the foregoing description are not intended to represent the only form of the invention in regard to the details of its construction and manner of operation. In fact, it will be evident to one skilled in the art that modifications and variations can be made without departing from the spirit and scope of the invention. Although specific terms have been employed, they are intended in a generic and descriptive sense only and not for purposes of limitation.

What is claimed is:

1. A position adjustable outlet box system, comprising:
   an outlet box cage;
   a drywall ring having a projecting neck portion, which drywall ring is attachable to the outlet box;
   a mounting plate to which the outlet box cage is attached and having a outlet box aperture formed therein;
   an outlet box that is slideably retained in the outlet box cage; and
   an adjustment mechanism that permits adjustment of the depth position of the outlet box in the outlet box cage.

2. The position adjustable outlet box system of claim 1, wherein the adjustment mechanism comprises a bolt with a distal end that rotatably engages with the outlet box cage, but without moving axial therewith, a threaded shaft that engages a threaded hole in the outlet box, and a turning engagement at a proximal end thereof.

3. The position adjustable outlet box system of claim 1, wherein the outlet box cage has a rear wall, the adjustment mechanism has a head which rotatably engages with the rear wall to permit free rotation of the adjustment mechanism relative to the outlet box guide cage, and the outlet box has a threaded aperture formed therein, with the adjustment mechanism threadably engaging the aperture in the outlet box and the adjustment mechanism having a turning surface to permit the adjustment mechanism to be turned from within the outlet box to thereby adjust the depth position of the outlet box within the outlet box cage.

4. The position adjustable outlet box system of claim 1, wherein the outlet box cage has a rear wall with a slot formed therein, the adjustment mechanism comprises a bolt with a head with a cylindrical groove formed therein, which grooved head rotatably fits within the slot to permit free rotation of the adjustment bolt within the slot, and the outlet box has a rear wall that has a threaded aperture formed therein, with the adjustment bolt threadably engaging the aperture.

5. The position adjustable outlet box system of claim 1, wherein the outlet box cage has tabs to permit engagement with catches that are formed on the mounting plate.

6. The position adjustable outlet box system of claim 1, wherein the outlet box cage has guide rails to slideably retain the outlet box therein.

7. The position adjustable outlet box system of claim 1, wherein the mounting plate has a plurality of outlet box apertures formed therein to permit the outlet box cage and outlet box to be mounted in a plurality of positions or for multiple outlet box guide cages and outlet boxes to be mounted thereto.

8. The position adjustable outlet box system of claim 1, wherein the outlet box aperture in the mounting plate is elongate, and elongate slots are formed adjacent to the elongate outlet box aperture.

9. The position adjustable outlet box system of claim 1, wherein the mounting plate has a foot portion for attachment to a floor.

10. The position adjustable outlet box system of claim 1, wherein the projecting neck portion of the drywall ring is between about 2.5 centimeter and 5.1 centimeter long.

11. The position adjustable outlet box system of claim 1, wherein the outlet box cage has a back wall and connected side rails, the side rails being spaced apart to guide the outlet box.

12. The position adjustable outlet box system of claim 1, wherein the outlet box comprises an electrical outlet box.

13. The position adjustable outlet box system of claim 1, wherein the outlet box cage further comprises a catch for engaging a far side bracket.

14. A position adjustable outlet box system, comprising:
    an outlet box cage having a first depth;
    a drywall ring having a projecting neck portion, which drywall ring is attachable to the outlet box;
    an outlet box having a having a second depth, which second depth is less than the first depth of the outlet box cage, the outlet box being slideably retained in the outlet box cage; and
    an adjustment mechanism that permits adjustment of the depth position of the outlet box in the outlet box cage.

15. The position adjustable outlet box system of claim 14, further comprising a mounting plate with an outlet box aperture formed therein to which the outlet box guide cage attaches.

16. The position adjustable outlet box system of claim 14, wherein the outlet box cage has a rear wall, the adjustment mechanism has a head which rotatably engages with the rear wall to permit free rotation of the adjustment mechanism relative to the outlet box guide cage, and the outlet box has a threaded aperture formed therein, with the adjustment mechanism threadably engaging the aperture in the outlet box and the adjustment mechanism having a turning surface to permit the adjustment mechanism to be turned from within the outlet box to thereby adjust the depth position of the outlet box within the outlet box cage.

17. The position adjustable outlet box system of claim 14, wherein the outlet box cage has guide rails to slideably retain the outlet box therein.

18. A position adjustable outlet box system for use with outlet boxes, comprising:
    an outlet box guide cage;
    a mounting plate to which the outlet box guide cage is attached and having a outlet box aperture formed therein; and
    an adjustment mechanism that has a distal end that rotatably engages the outlet box guide cage without moving axial therewith, said adjustment mechanism has a threaded shaft and a turning engagement at a proximal end thereof to permits adjustment of the depth position of the outlet box in the outlet box cage, said outlet box cage having guide rails to keep said outlet box in a stable position.

19. The position adjustable outlet box system of claim 18, wherein the adjustment mechanism comprises a bolt with a distal end that rotatably engages with the outlet box cage, but without moving axial therewith, a threaded shaft, and a turning end at a proximal end thereof.

20. The position adjustable outlet box system of claim 18, wherein the outlet box cage has tabs to permit engagement with catches that are formed on the mounting plate.

21. The position adjustable outlet box system of claim 18, wherein the outlet box cage further comprises a catch for engaging a far side bracket.

22. The position adjustable outlet box system of claim 18, wherein the outlet box comprises an electrical outlet box.

* * * * *